Patented June 21, 1927.

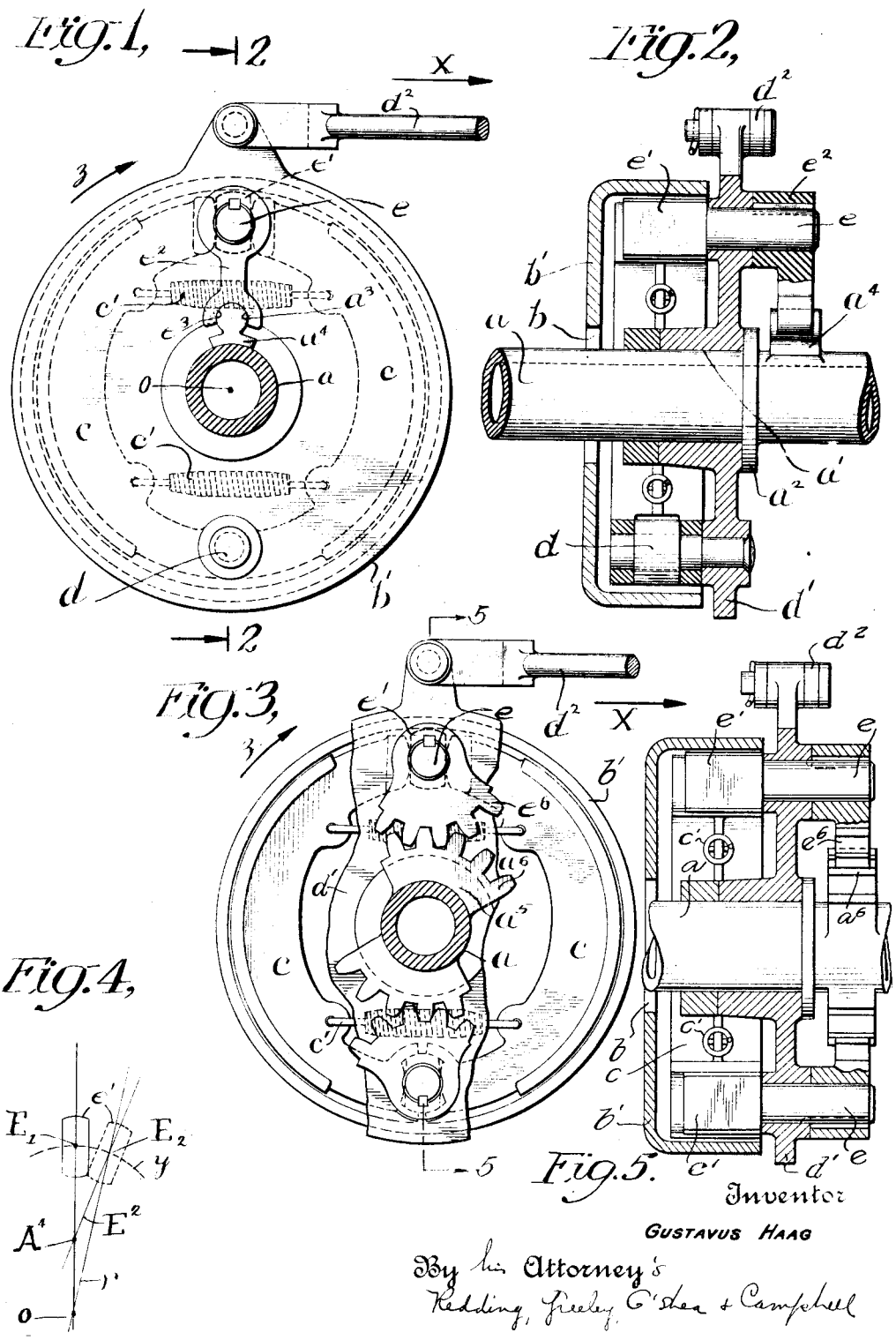

1,632,961

UNITED STATES PATENT OFFICE.

GUSTAVUS HAAG, OF NEW YORK, N. Y., ASSIGNOR TO INTERNATIONAL MOTOR COMPANY, OF NEW YORK, N. Y., A CORPORATION OF DELAWARE.

BRAKE MECHANISM.

Application filed October 29, 1925. Serial No. 65,528.

This invention relates to brake mechanism more particularly of the type known as brake mechanism wherein the momentum of the element to be retarded is availed of to supplement the initial brake actuating force in the application of braking power. The present invention has for its object to still further supplement the braking force resulting from the utilization of the momentum of the element to be retarded whereby a relatively greater braking effect is attained from a comparatively small initial application of power. In accordance with the invention mechanical movements are availed of to increase the braking power afforded through the instrumentality of brake mechanism. More particularly actuating devices are movable concentric with respect to the axis about which the brake shoes move in the initiation of the braking action and said devices are also movable eccentrically with respect to another axis whereby a toggle action is afforded with consequent increase of the braking power applied to the brake shoes. In the application of the invention to the wheel of a vehicle the brake drum carried with the wheel is rotatable about the axle housing and a brake spider is similarly rotatable through manually operable devices. Within the brake drum are disposed brake shoes caused to contact with the brake drum by a cam mounted upon a shaft rotatable in the brake spider to which the brake shoes may be anchored. Carried upon the rotatable cam shaft is a lever which is fulcrumed upon a cam-shaped lug carried with the axle housing. Upon the rotation of the spider about the axle housing by manual actuation of a brake pull rod connected thereto, the cam shaft is caused to rotate due to the arcuate movement of its axis about the axis of the axle housing through the instrumentality of the lever fulcrumed eccentric to the housing, which rotation of the cam shaft causes the cam to actuate the brake shoes. In place of pivoting the brake shoes upon the brake anchor, a second cam shaft may be diametrically disposed upon the spider with respect to the aforesaid cam shaft and caused to rotate in a similar manner by another camming lug serving as a fulcrum for a lever carried with the shaft. In this manner two cams actuate the brake shoes whereby substantially one-half the reaction of one brake shoe is taken on the last named lug instead of a brake anchor so that approximately fifty per cent more braking power is applied by the brake shoes. Various mechanical equivalents of the camming lug and lever fulcrumed thereon may be availed of to initiate the application of the brake shoes, as for instance a sector, toothed or otherwise, may be carried with the stationary base about which the spider rotates to cooperate with a similar sector carried upon the end of the cam shaft lever arm. In order that the invention may be clearly understood and readily carried into effect the same will now be described more fully with reference to the accompanying drawings illustrating a preferred embodiment thereof in which:

Figure 1 is a view in side elevation and partly in section of brake actuating mechanism according to the present invention, the location of a brake drum and brake shoes to be applied thereto being indicated.

Figure 2 is a transverse vertical sectional view of the brake mechanism illustrated in Figure 1 taken in the plane indicated by the line 2—2 in Figure 1 and looking in the direction of the arrows.

Figure 3 is a view similar to Figure 1 but showing a modification of the brake actuating mechanism wherein toothed sectors are availed of in the toggle connection.

Figure 4 is a diagrammatic view showing the manner in which the toggle action is availed of to initiate the application of the cams.

Figure 5 is a view in section showing the modified form of the invention.

Referring first to the structure illustrated in Figures 1 and 2 an axle housing $a$ which is always relatively stationary because it is bolted to the springs of a vehicle (not shown) is shown as passing through an aperture $b$ in a brake drum $b'$ carried upon a wheel, not shown, and therefore rotatable about the relatively stationary axle housing. Within the brake drum $b'$ and bearing against the interior surface thereof are illustrated a pair of brake shoes $c$, anchored, as by the pivotal connection $d$ to a brake spider $d'$ freely rotatable about the axle housing $a$ upon a bearing surface $a'$ defined by the flange $a^2$. Brake shoes $c$ are normally maintained out of contact with the brake drum by the coil springs $c'$. The brake spider is rotatable about the axle housing through the instrumentality of a brake pull rod $d^2$ which may be moved in the direction of the arrow $x$ manually. Rotatably mounted in the brake spider $d'$ and diametrically disposed with respect to the pivotal connection $d$ is a cam shaft $e$ carrying at its end within the brake drum a cam $e'$ adapted to bear upon the proximate ends of the brake shoes. Upon the opposite end of the cam shaft there is keyed an arm or lever $e^2$ formed with a cam surface $e^3$ adapted to co-operate with the cam surface $a^3$ of a lug $a^4$ carried with the axle housing $a$.

In the application of braking power the spider $d'$ is caused to rotate by relatively slight force applied to the pull rod $d^2$. Rotation of the spider carries the cam shaft $e$ in an arc $y$, Figure 4, from the position indicated at $E'$ to that indicated at $E^2$ concentric with the axis $o$ of the axle housing $a$ but during such movement the arm $e^2$ remains fulcrumed upon the lug $a^4$ eccentric to the axis $o$. In Figure 4 the axis of the arm $e^2$ is indicated at $E^2$ and the lug at $A^4$ the radial distance of the cam shaft $e$ from the axis $o$ being indicated at $r$. It will thus be apparent from an inspection of Figure 4 that due to the angularity of the radii $E^2$ and $r$ that a toggle action is obtained which increases the force availed of to apply the cam $e'$ to the proximate ends of the brake shoes $c$ and at the same time initiates the camming action.

In lieu of anchoring the brake shoes to the brake spider at $d$ a second cam shaft may be availed of diametrically disposed with respect to the first cam shaft $e$ and similarly provided with a cam and lever arm fulcrumed upon a sector similar to the lug $e^6$ but diametrically disposed with respect thereto. Such a structure is shown in Figures 3 and 5. In this construction upon rotation of the brake spider $d'$ cams are actuated at both ends of each brake shoe and one half of the reaction of the brake shoe is taken on a sector instead of being taken by the brake shoe anchor so that approximately fifty percent more braking power is applied to the brake shoes.

In Figure 3 there is illustrated a modification of the invention wherein in lieu of the camming surfaces $e^3$ and $a^3$ toothed sectors are availed of. Such parts of the brake mechanism which are similar in every respect to those parts illustrated in Figure 1 will not be described with respect to this figure but have been given the same reference characters. In lieu of the lug $a^4$ there is shown a sector $a^5$ formed with teeth $a^6$ adapted to mesh with teeth $e^5$ on a toothed sector $e^5$ carried upon the shaft $e$ bearing the cam $e'$. Thus upon rotation of the spider $d'$ through the instrumentality of the pull rod $d^2$ the cam $e'$ is caused to bear against the proximate ends of the brake shoes $c$ by the contact of the sectors $e^5$ and $a^5$.

It will thus be seen that a brake mechanism is proposed wherein only slight initial force is necessary to initiate an action and that due to mechanical movements the force availed of by the momentum of the element to be retarded is supplemented or magnified.

The invention is not to be deemed limited to its application to the wheel of a motor vehicle but is equally applicable in any situation wherein a rotating element is to be retarded. Various co-acting elements such as toothed sectors or cam surfaces may be availed of in the instrumentality effecting the magnification of the braking action and no limitation is intended by the foregoing description or illustrations except as indicated in the accompanying claims.

What I claim is:

1. In a brake, in combination, a stationary shaft, a brake drum rotatable about said shaft, a brake spider rotatable about said shaft, means to rotate the brake spider, a pair of brake shoes within the drum, diametrically disposed cam shafts rotatably mounted on the spider, cams on the cam shafts engaging the proximate ends of the brake shoes, arms rigidly carried with the cam shafts, cams carried with the stationary shaft and engaging the ends of the arms.

2. In a brake, in combination, an axle housing, a brake drum rotatable about the axle housing, a brake spider rotatable about the axle housing, means to rotate said spider, a pair of brake shoes disposed within the drum, diametrically disposed cam shafts rotatably mounted on the spider, cams carried with said cam shafts and engaging the proximate ends of the brake shoes, arms rigidly carried with the cam shafts, and cams carried with the axle housing to be engaged by said arms.

3. In a brake, in combination, an axle housing, a brake drum rotatable about said axle housing, a brake spider rotatable about the axle housing, means to rotate the spider, a brake shoe within the brake drum, a cam shaft rotatably mounted on the spider, a cam carried with the shaft and engaging proximate ends of the brake shoes, an arm rigidly carried with the cam shaft, a sector carried with the axle housing, and a sector carried with the end of the arm and engaging said first named sector.

4. In a brake, in combination, an axle housing, a brake drum rotatable about said axle housing, a brake spider rotatable about the axle housing, means to rotate the spider, a brake shoe within the brake drum, a cam shaft rotatably mounted on the spider, a cam carried with the shaft and engaging proximate ends of the brake shoes, an arm rigidly carried with the cam shaft, a toothed sector carried with the axle housing, and a toothed sector carried with the end of the arm and engaging said first named toothed sector.

5. In a brake, in combination, an axle housing, a brake drum rotatable about the axle housing, a brake spider rotatable about the axle housing, means to rotate the spider, a pair of brake shoes within the brake drum, diametrically disposed cam shafts rotatably mounted on the spider, cams carried with the cam shafts and engaging proximate ends of the brake shoes, arms rigidly carried with the ends of the cam shafts, sectors on the arms, respectively, and sectors carried with the axle housing to be engaged by the sectors on the arms.

This specification signed this 27 day of Oct. A. D. 1925.

GUSTAVUS HAAG.